May 23, 1967

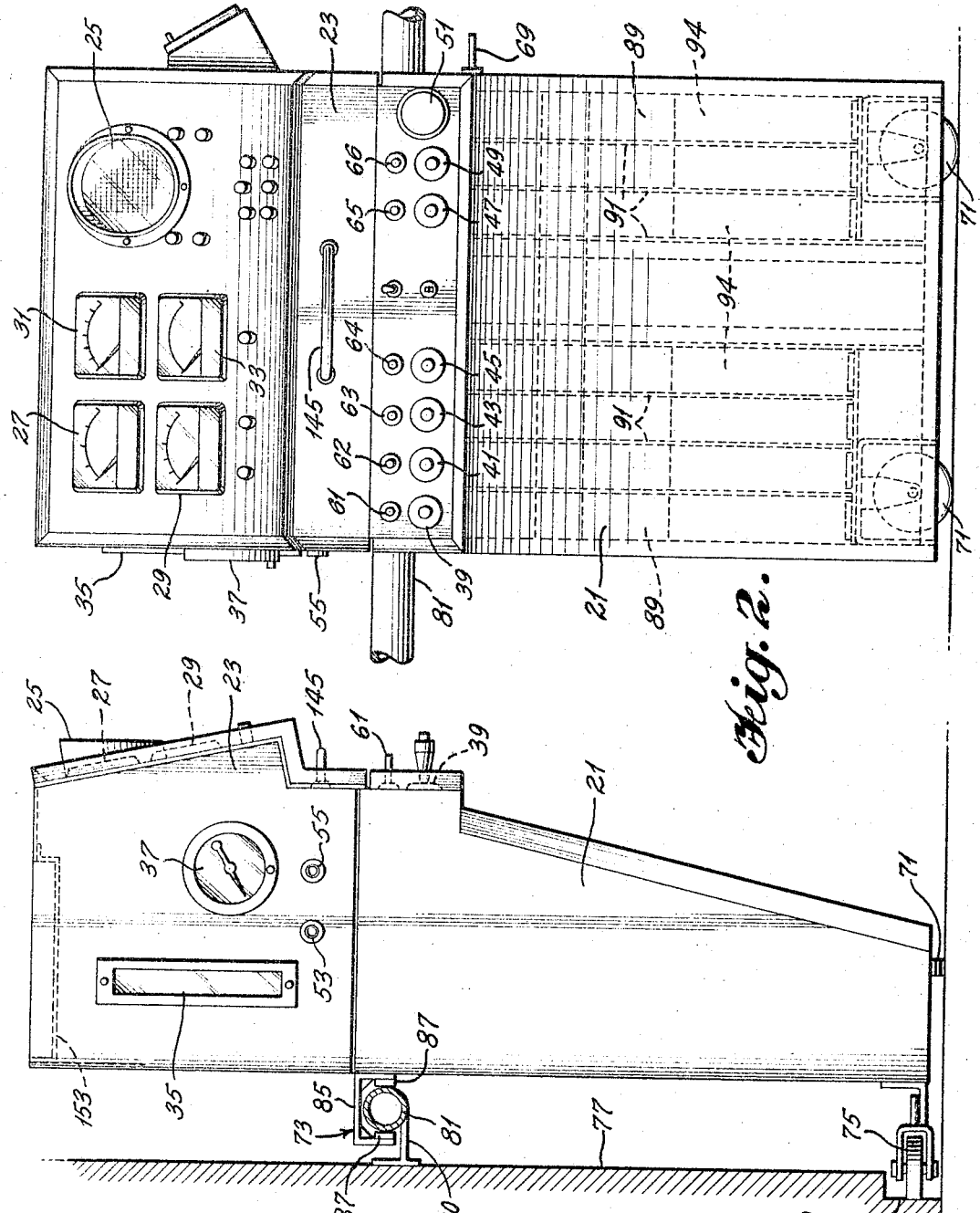

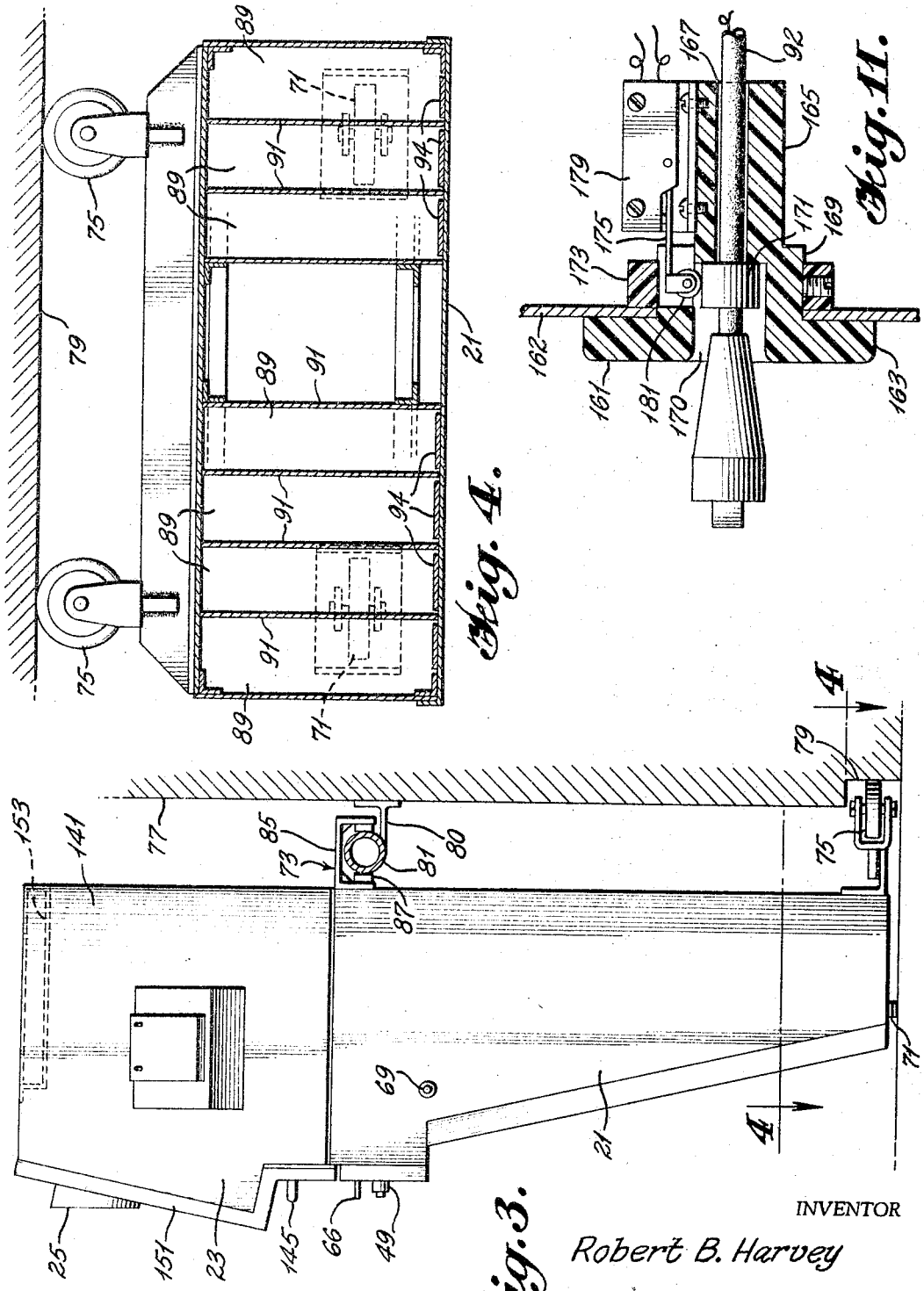

R. B. HARVEY 3,320,800

MOBILE INSTRUMENT CARRIAGE

Filed May 18, 1964

INVENTOR
Robert B. Harvey

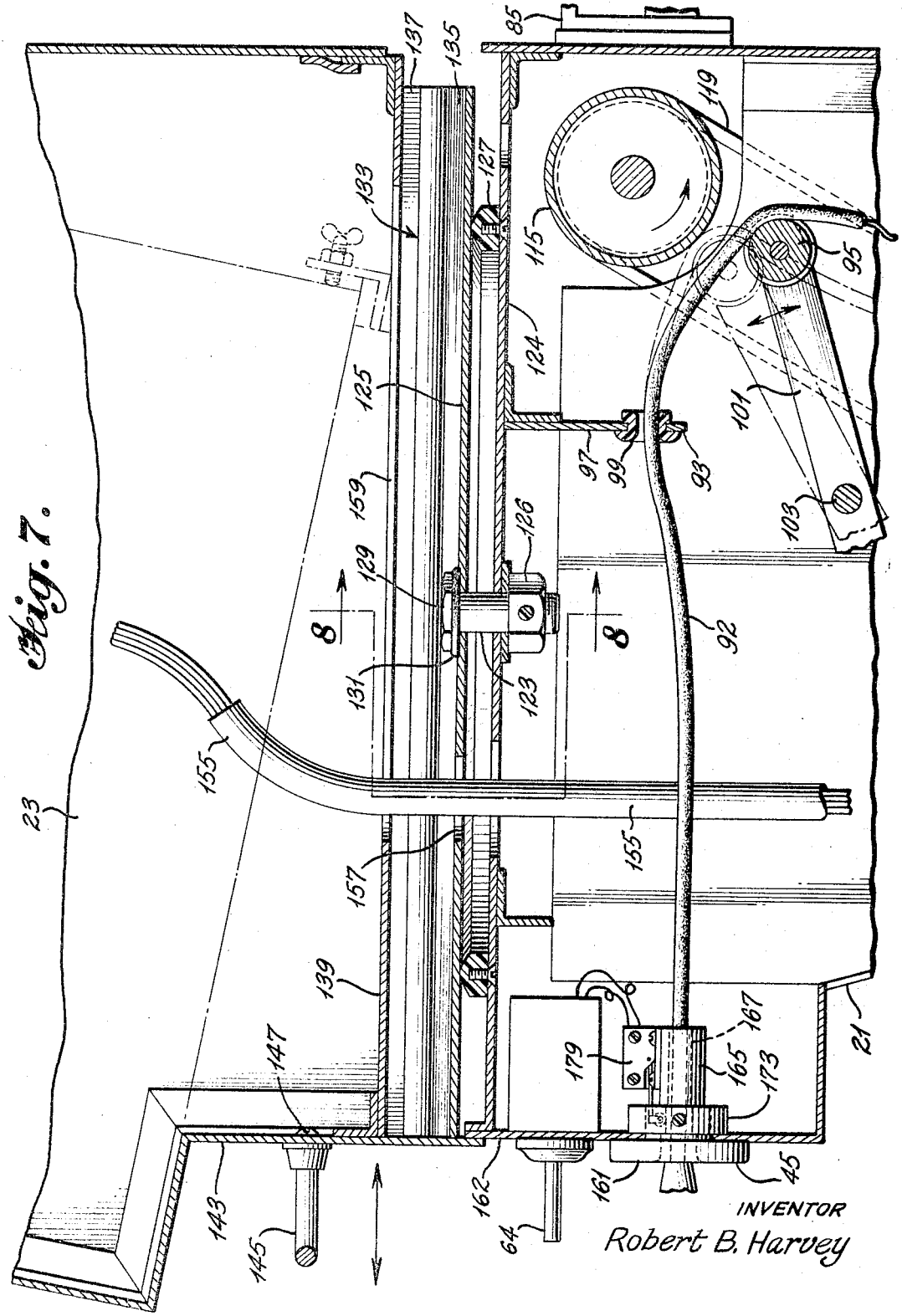

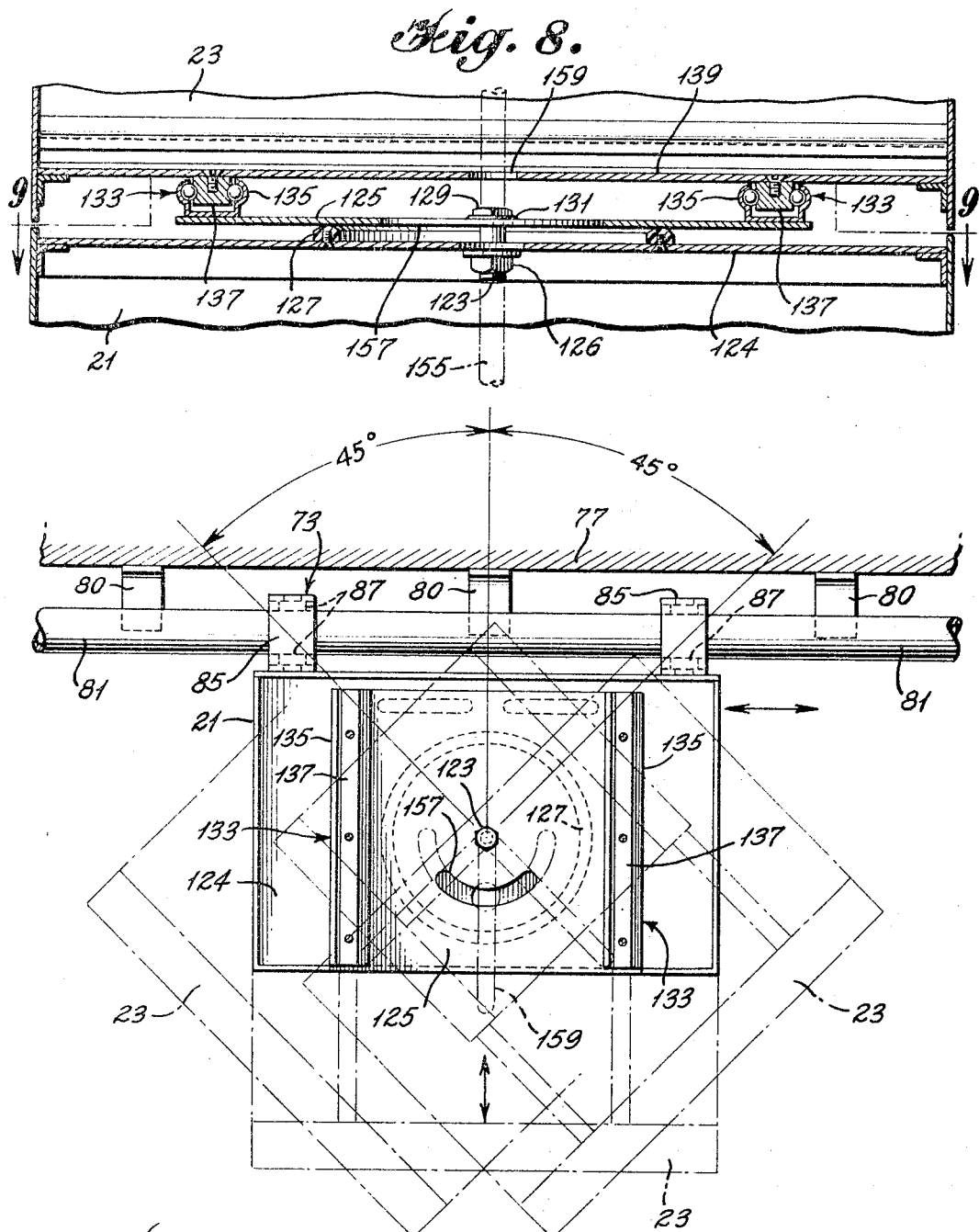

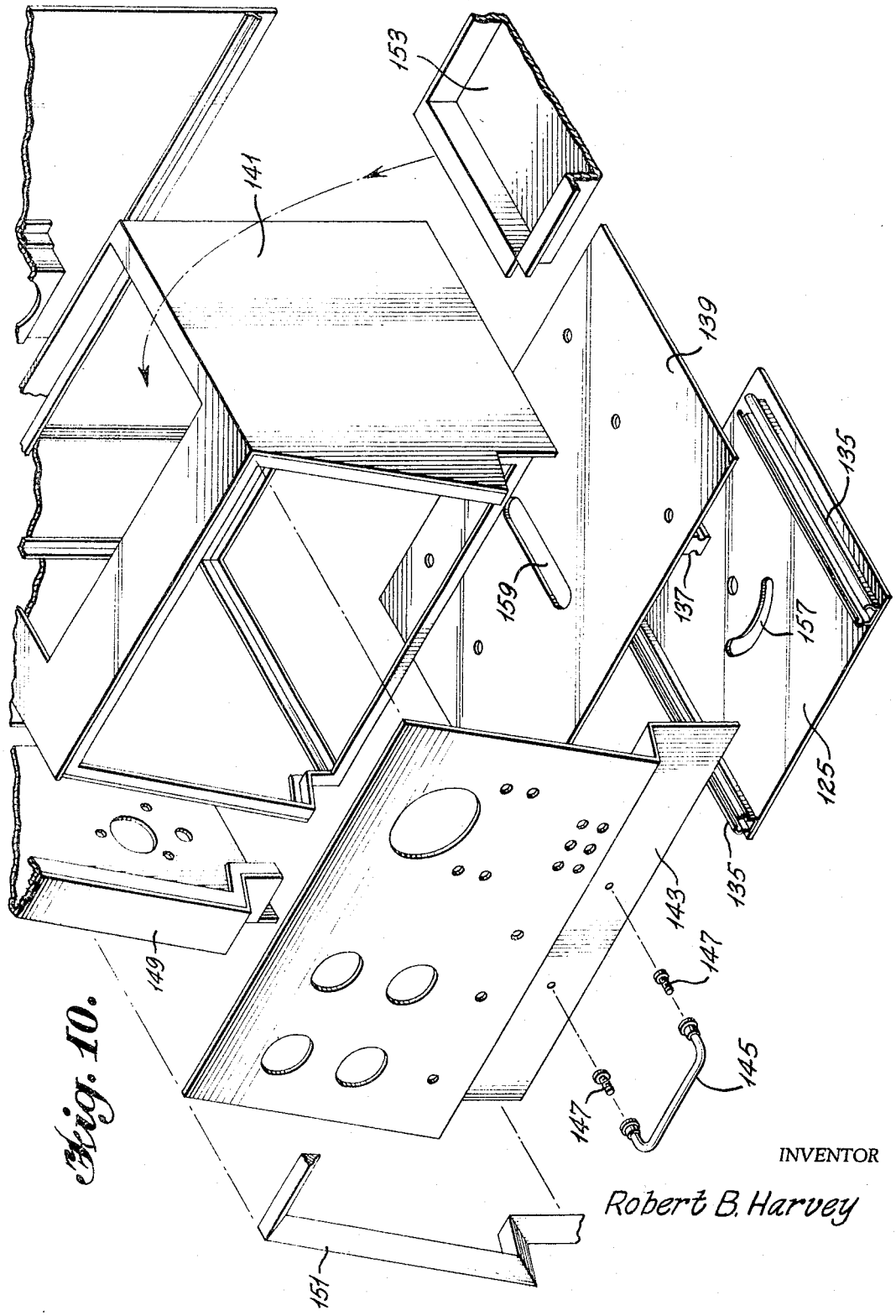

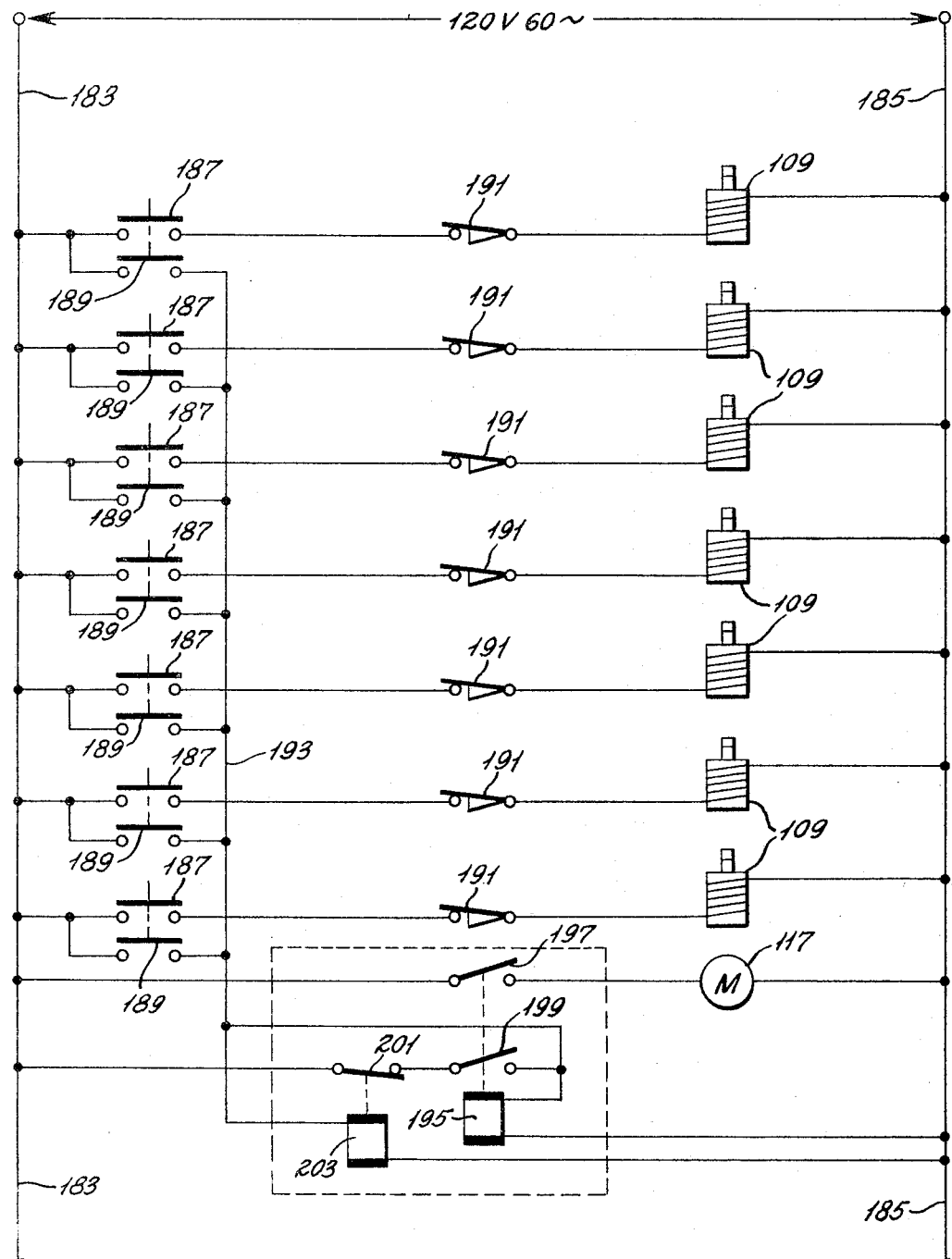

United States Patent Office 3,320,800
Patented May 23, 1967

3,320,800
MOBILE INSTRUMENT CARRIAGE
Robert B. Harvey, Rosemont, Pa., assignor to Mobil Oil Corporation, a corporation of New York
Filed May 18, 1964, Ser. No. 368,075
7 Claims. (Cl. 73—116)

This invention relates to mobile instrument carriages and more particularly to a mobile instrument carriage housing automotive vehicle test instruments designed for use in an automotive diagnostic system.

In copending application Ser. No. 276,702 entitled, "Automotive Vehicle Servicing," filed Apr. 30, 1963, and invented by George B. Myrtetus and Charles H. Pancoast there is disclosed an integrated, extremely efficient automotive diagnostic system requiring a minimum of skilled personnel and by means of which most of the conditions needing correction or effecting the operational characteristics of the vehicle are first completely and accurately diagnosed and the diagnosis recorded so that it may be presented in clear and concise terms to the vehicle owner. The system is arranged such that automotive vehicles in sequence are passed successively in an extremely short period of time through a diagnostic bay in which the vehicles are completely and thoroughly tested. After the diagnostic procedure has been completed, the owner is given a full report by one or two diagnosticians who performed the tests prior to the correction or repair of any condition indicated to be substandard.

As disclosed in the above-described copending application, the system makes use of a mobile instrument carriage, in which automotive test instruments are mounted. The mobile instrument carriage is movable through a small area including a position adjacent the front end of the vehicle having its rear wheels engaged by the rollers of a dynamometer provided in the automotive diagnostic bay. The use of a mobile instrument carriage in this manner facilitates the process of connecting the test instruments mounted on the carriage to the vehicle and thus saves time. As pointed out in the above-described copending application the saving of time is very important to the automotive diagnostic system because in order for the diagnostic system to be economically practical, the entire diagnostic process must be carried out in a very short time interval and the time-saving features such as the mobile instrument carriage help to make the automotive diagnostic system economically practical.

The mobile instrument carriage of the present invention is an improvement over the mobile instrument carriage disclosed in the above-mentioned copending application. The mobile instrument carriage of the present invention rests on a pair of wheels on the floor of the diagnostic bay and is stabilized by a glide assembly provided between the wall of the diagnostic bay and the carriage. The carriage is divided into upper and lower portions with the upper portion housing the test instruments and the lower portion providing bins into which the leads of the test instruments are loosely piled when the test instruments are not in use. The upper portion of the instrument carriage swivels on the lower portion and can be extended out horizontally from the lower portion to thus enable the test instruments housed in the upper portion to be positioned and oriented in whatever manner the diagnosticians making the tests find most convenient. Means are provided for each of the leads operable when actuated to retract the leads into the bins of the instrument carriage. This feature gets the instrument leads out of the way when they are not in use and thus facilitates the testing operation and particularly facilitates the disconnecting of the test instruments from the vehicle. The feature of loosely piling the leads in bins when they are retracted reduces the maintenance required for the instrument carriage and enables longer instrument leads to be retracted.

Accordingly, a principal object of the present invention is to provide an improved mobile instrument carriage.

Another object of the present invention is to provide an improved mobile instrument carriage for use in an automotive diagnostic test bay.

A further object of the present invention is to provide an improved lead retracting system for test instruments.

A still further object of the present invention is to facilitate the maintenance of a mobile instrument carriage.

A still further object of the present invention is to facilitate the connection and disconnection of test instruments from automotive vehicles in an automotive diagnostic system.

Further objects and advantages of the present invention will become readily apparent as the following detailed description of the invention unfolds and when taken in conjunction will the drawings wherein:

FIG. 1 is a side view in elevation of the mobile instrument carriage of the present invention;

FIG. 2 is a front view in elevation of the mobile instrument carriage of the present invention;

FIG. 3 is a side view in elevation of the mobile instrument carriage of the invention showing the side opposite to that shown in FIG. 1;

FIG. 4 is a sectional view taken along the lines 4—4 in FIG. 3 illustrating the bins in the lower portion of the instrument carriage;

FIG. 5 is a front view in elevation of the lower portion of the instrument carriage with the front panel of the lower portion removed;

FIG. 6 is a sectional view of FIG. 5 taken along the lines 6—6;

FIG. 7 is an enlarged vertical section of the instrument carriage illustrating the details of the lead retracting mechanism and also details of the swivel joint between the upper and lower portions of the carriage;

FIG. 8 is a sectional view taken along the line 8—8 of FIG. 7 illustrating details of the swivel joint between the upper and lower portions of the carriage;

FIG. 9 is a sectional view taken along the lines 9—9 of FIG. 8;

FIG. 10 is an exploded view of the cabinet assembly of the upper portion of the instrument carriage;

FIG. 11 is an enlarged sectional view illustrating a limit switch arrangement for automatically disabling the lead retracting mechanism when a lead is fully retracted; and FIG. 12 is a schematic diagram of the circuit for controlling the operation of the lead retracting mechanism.

As shown in FIGURES 1, 2 and 3 the mobile instrument carriage of the present invention comprises a lower portion 21 and an upper portion 23. The upper portion 23 houses the test instruments, which comprise an engine scope 25 for displaying waveforms produced in the ignition system of an automotive vehicle, a volt meter 27 and an ammeter 29 for taking measurements on the electrical system of an automotive vehicle, a meter 31 for indicating the amount of spark advance and a meter 33 for indicating the vacuum in the manifold of an automotive vehicle. The upper portion 23 also houses on the side thereof meters 35 and 37, which provide visual indications of the rate of fuel flow and fuel pressure respectively in the fuel supply system of an automotive vehicle. The manner in which these various instruments are connected to the automotive vehicle to perform the tests in the diagnostic system is fully described in the above-mentioned copending application, Ser. No. 276,702. As described in this copending application the volt meter and ammeter are connected to the electrical system of the vehicle by three leads one of which connects to the ground side of the battery, a second of which connects to the hot side of the battery and the third of which connects to the terminal post of the regulator which is normally connected to the battery. These three leads are in the form of conduits which can be manually pulled out from sockets 39, 41 and 43. The vacuum gauge 33 can be connected to the manifold of the automotive vehicle being tested by means of a hose conduit which is adapted to be pulled out manually from a socket 45. The leads for the engine scope 25 are connected to the high voltage output of the ignition coil and to the ignition wire of the No. 1 cylinder as is disclosed in the above-mentioned application. These leads are in the form of conduits which can be manually pulled out from sockets 47 and 49. A timing light is also provided on the mobile instrument carriage and is connected to the automotive vehicle by one of the leads connecting the engine scope 25 to the automotive vehicle as is described in the above-mentioned copending application. The timing light is on the end of a conduit, which can be extended by manually pulling it out from a socket 51. The meter 31 coacts with the timing light 51 to provide indication as to the amount of spark advance. The fuel flow meter 35 and the fuel pressure meter 37 are connected to the fuel supply system of the vehicle by means of hoses which connect to the mobile instrument carriage at points 53 and 55. Above the sockets 39, 41, 43, 45, 47 and 49 are wobble sticks 61 through 66 respectively. By actuating the wobble sticks 61 through 66 any of the conduits which have been pulled out from the sockets 39, 41, 43, 45, 47 and 49 can be retracted. If the conduit has been pulled out from the socket 39 then actuation of the wobble stick 61 will cause a mechanism to retract in this conduit back into the socket 39. Similarly the wobble sticks 62 through 66 will cause the retraction mechanism to retract the conduits which have been pulled out from the sockets 41, 43, 45, 47 and 49 respectively. A wobble stick 69 mounted on the side of the lower portion 21 of the carriage controls the retraction of the timing light which can be pulled out from the socket 51. The retraction mechanism, which individually retracts the conduits which are pulled out from the sockets 39, 41, 43, 45, 47 and 49 and the timing light from the socket 51 in response to the actuation of the wobble stick 61 through 66 and 69 respectively, will be described in more detail below.

The lower portion 21 of the cabinet is supported on two wheels 71 which rest on the floor and which are oriented to permit the carriage to roll sideways. The carriage is positioned near the side wall 77 of the diagnostic bay in which it is to be mounted and is stabilized by means of a glide assembly 73 and wheels 75, which are mounted on the back of the lower carriage portion 21 near the bottom thereof and which engage the side wall 77 in a channel 79 defined in the bottom of the side wall. The glide assembly 73 comprises a stainless steel tube 81 which extends along the side wall 77 just below the dividing line between the upper and lower carriage portions 21 and 23. The tube 81 is mounted on the side wall 77 by means of steel T's 80, to which it is welded. Two U-shaped brackets 85 are fixed to the back of the lower portion 21 into which the stainless steel tube 81 is received. The legs of each bracket 85 extend downwardly on each side of the tube 81. Mounted on the inner sides of these legs are Teflon guides 87, which engage the tube 81. When the carriage is moved along the wall it rolls on the floor of the bay and on the side wall 77 on the wheels 71 and 75 and slides along the tube 81 on the Teflon guides 87.

As shown in FIGURES 4 and 5 the lower portion 21 of the carriage is divided into bins 89 by means of partitions 91 which extend across the lower portion 21 from the front wall thereof to the back wall thereof. When the conduits are retracted into the carriage they are piled loosely into the bins 89 with each conduit being piled into a different bin, as is illustrated in FIGURES 5 and 6. The conduits are designated by the reference number 92. An individual door 94 closes the front of each of the bins 89. The doors which are behind the slanting front panel of the lower carriage portion 21, are hinged at the bottom and have a magnetic catch at the top. The doors 94 serve to keep the conduits from spilling out from the bins when the front panel of the lower carriage portion is removed.

As shown in FIGS. 5, 6 and 7 each conduit 92 extends from its corresponding socket, through which it can be withdrawn, through a Teflon cable guide 93 over a roller 95 and then down into one of the bins 89. Each of the cable guides 93 comprises a bracket 97 in which a Teflon grommet 99 is mounted defining an eye through which the conduit passes. Each roller 95 is mounted on the end of a lever arm 101 which is pivotally mounted midway between its ends at a pivot point 103. The other end of each lever arm 101 is connected by means of a spring 105 to the armature 107 of a solenoid 109. The armature 107 of each solenoid 109 is also connected by means of a spring 111 to a common bar 113 which extends across the front of the lower carriage portion 21. When the solenoid 109 is not energized, the lever arm 101 will be in the position illustrated in FIG. 7, and when the solenoid 109 is energizing, it will pull the armature 107 down pivoting the arm 101 and raising the roller 95 to the position shown in phantom in FIG. 7. When the arm 101 is pivoted in this manner by the energization of the solenoid 109, the roller 95 will move the conduit passing over it into engagement with a platen 115 and the conduit will be pinched between the roller 95 and the platen 115. The platen 115 extends all the way across the lower carriage portion 21 and is common to all of the rollers 95 and the conduits 92. When one of the solenoids 109 is energized to pinch the corresponding conduit 92 between the corresponding roller 95 and the platen 115, a motor 117 will be energized to drive the platen in a counter-clockwise direction as it is viewed in FIG. 6. This will cause the conduit to be retracted through its cable guide 93 and through its socket in the front of the lower carriage portion 21. The conduit being retacted after passing between the roller 95 and the platen 115 will fall down into one of the bins 89, where the conduit will be loosely piled. Thus in order to retract any conduit back into the instrument carriage and pile it into its bin, it is merely necessary to energize the solenoid 109 corresponding to this conduit. The platen 115 is driven by means of a belt 119 from the motor 117, which is mounted on a plate 121 in a chamber in the middle of the lower carriage portion 21 between the bins 89. When the conduit is fully retracted into its socket it will actuate a limit switch, which will de-energize the solenoid 109 and permit the roller 95 to fall away from the platen and thus the platen will not continue to pull on the conduit after the conduit has been withdrawn all the way into its socket. The details of the limit switch operation will be described below.

As shown in FIGS. 7, 8 and 9, the upper portion 23 of the carriage is pivotally connected to the lower portion 21 of the carriage by means of a vertically disposed bolt 123, which is fixed to the top wall 124 of the lower portion 21 by means of a nut 126. The bolt 123 is rotatably journaled through a plate 125, which is referred to as a turntable and which rests on a Teflon ring 127 fixed to the top side of the wall 124 and disposed concentrically about the bolt 123. The bolt 123 has a hexagonal head 129 on its upper end. This hexagonal head is separated from the turntable 125 by means of a washer-shaped bearing member 131. When the upper carriage portion 23 is pivoted on the lower portion 21, the turntable 125 will rotate about the bolt 123 sliding on the Teflon ring 127. By this arrangement the upper carriage portion 23 can pivot through an angle of 90°, 45° to the left of center and 45° to the right of center as illustrated in FIG. 9.

The upper carriage portion 23 can be pulled out or extended in cantilever fashion from the lower carriage portion as illustrated in phantom in FIG. 9 as well as pivoted through the 90° angle. This extension of the upper carriage portion is achieved by means of ball bearing slide assemblies 133 best shown in FIGURES 8 and 9. The slide assemblies 133 comprise straight bearing tracks 135 fixed to the top of the turntable 125 on the outer edges thereof disposed parallel to one another and extending from the front of the turntable to the back of the turntable. Received in the tracks 135 are slide bars 137, which are fixed to the bottom wall 139 of the upper carriage portion 23. When the upper carriage portion is pulled out in cantilever fashion from the lower carriage portion, the slide bars 137 will slide in the tracks 135.

As shown in the exploded view of FIG. 10, the upper carriage portion comprises a casing frame 141 on which the bottom wall 139 is mounted covering the open bottom of the casing frame 141. A front panel 143, in which the scope 25 and the meters 27, 29, 31 and 33 are mounted, covers the open front of the casing frame 141. A handle 145 is fixed to the front panel 143 by means of screws 147. By means of the handle 145, the upper carriage portion is pulled out from the lower carriage portion and pivoted on the lower carriage portion. The open left side of the casing frame 141 is covered by a panel 149, in which the meters 35 and 37 are mounted. A molding 151 is attached to the front panel 143 extending around the edge of the front panel 143. The top of the casing frame 141 is provided with an opening, which is covered by a lid 153, so that access may be readily obtained to the interior of the upper carriage portion.

As shown in FIGURE 7 conduits 92 are connected to the meters in the upper carriage portion 23 through a cable 155, which passes through an arcuate slot 157 in the turntable 125 disposed concentrically with respect to the bolt 123 and through a slot 159 in the bottom wall 139. The slot 159 is positioned in the middle of the bottom wall 139 extending in the back to front direction on the carriage. The arcuate slot 157 permits the upper carriage portion 23 to pivot on the lower carriage portion 21 without interfering with the cable 155, and the slot 159 permits the upper carriage portion to be extended from the lower carriage portion 21 without interfering with the cable 155.

When one of the toggles 61 through 66 is actuated to energize one of the solenoids 109 and thus retract one of the conduits 92 into the lower carriage portion 21, the conduit 92 will be retracted until the end of the conduit is pulled into its corresponding one of the sockets 39, 41, 43, 45, 47 or 49. When the end of the conduit has been pulled into the socket, it will actuate a limit switch, which will open the circuit for the energized solenoid 109 and de-energize it thus permitting the roller 95 to drop away from the platen 115. Accordingly the platen 115 will not continue to pull on the conduit 92 after it has been fully retracted. FIG. 11 which is a sectional view through one of the sockets illustrates the limit switch arrangement. As shown in FIG. 11, the socket comprises a nylon cable stop 161 fitting in an aperture defined in the upper front wall 162 of the lower carriage porton 21. The cable stop 161 has a flange 163 which abuts against the front of the wall 162 and a barrel 165 which extends through the aperture in the wall 162. The barrel 165 has a bore 167, through which the conduit 92 passes and through which the conduit is pulled when the conduit is extended or retracted. The barrel 165 has a collar 169 which fits in the opening in the wall 162. The flange 163 and the collar 169 define a well 170 to receive a ring-shaped actuator 171 fixed to the conduit 92 near its end. The ring-shaped actuator 171 is pulled into the well 170 when the conduit is fully retracted. A ring 173 fits around and is fixed to the collar 169. The ring 173 abuts against the back of the wall 162 and holds the cable stop 161 in place. The collar 169 is slotted to receive the actuating arm 175 of a limit switch 179, which is mounted on the barrel 165. The slot in the collar 169 extends through to the well 170 and the actuating arm 175 has a roller 181 on the end thereof which projects into the well 170. When the conduit 92 is fully retracted and the actuator 171 is pulled into the well 170, the actuator 171 will engage the roller 181 and move the actuating arm 175. When the actuating arm 175 is moved in this manner, it will open a contact in the limit switch 179 and de-energize the solenoid 109 controlling this particular conduit 92. In this manner, the pulling action of the platen 115 on the conduit 92 is automatically terminated when the conduit is fully retracted. A similar limit switch arrangement is provided in the socket 51 for receiving the timing light and its conduit.

As shown in FIG. 12 the circuit for controlling the energization of the solenoids 109 and the motor 117 comprises a pair of busses 183 and 185 across which 60-cycle 120 volt A.C. power is applied. Each of the wobble stick actuators 61–66 and the wobble stick actuator 69 operates to close a pair of contacts 187 and 189 of a different double-throw switch. Each of the contacts 187 when closed completes a circuit connected between the busses 183 and 185 for energizing the corresponding solenoid 109. Each of these circuits for energizing the solenoids 109 includes a normally closed contact 191 of the corresponding limit switch 179. Thus when one of the wobble sticks 61–66 is actuated, the solenoid 109 corresponding to this wobble stock will be energized and cause the conduit 92 corresponding to this wobble stick to be pinched between the platen 115 and the corresponding roller 95 thus causing the conduit 92 to be reeled in and piled loosely in one of the bins 89. The conduit will continue to be drawn in for as long as the wobble stick is actuated until the actuator 171 on the conduit is pulled into the socket for the conduit and engages the roller 181 causing the contacts 191 in the energizing circuit for the solenoid 109 to open thus de-energizing the solenoid and allowing the conduit 92 to fall away from platen 115. Each of the contacts 189 connects the bus 183 to a common conductor 193 when closed. The conductor 193 is connected to one side of a control relay 195, the other side of which is connected to the bus 185. Thus when any one of the contacts 189 is closed the control relay 195 will be energized. When the control relay 195 is energized it closes normally open contacts 197 and normally open contacts 199. The contacts 197 upon closing connect the motor 117 between the busses 183 and 185. Thus the motor 117 will be energized and will drive the platen 115 whenever any one of the wobble sticks 61 through 66 or 69 is actuated. The contacts 199 connect the conductor 193 to the bus 183 over normally closed contacts 201, thus closing a holding circuit for the relay 195 maintaining it energized after all of the contacts 189 have been opened upon the release of the wobble sticks. The conductor 193 is connected to one side of a time delay relay 203, the other side of which is connected to the bus 185. Thus when any one of the contacts 189 is closed upon actuation of one of the wobble sticks, the relay 203 will be energized. The relay 203 controls the normally closed contacts 201 and will open these contacts after a predetermined time delay thus opening the holding circuit to the relay 195 after a predetermined time delay. The purpose of the holding circuit, which is opened after a predetermined time delay, is to prevent the motor from being started and stopped repeatedly in a short period of time. Once the motor 117 has been energized it will remain energized for a period of time for at least as long as the predetermined delay provided by the time delay relay 203.

The above described mobile instrument carriage, because of its mobility and because of the fact that the upper carriage portion containing the meters to be read can be swiveled on and extended out from the lower carriage portion, facilitates the testing of automotive vehicles with the instruments in the carriage. Because of the improved lead retraction system in the carriage, the connection and disconnection of the test instruments is greatly facilitated and because the carriage is supported on the floor of the diagnostic bay the maintenance of the instrument carriage is facilitated.

The above described mobile instrument is a specific embodiment of the invention and many modifications may be made thereto without departing from the spirit and scope of the invention, which is defined in the appended claims.

What is claimed is:

1. A testing apparatus comprising: cabinet means having upper and lower portions; a plurality of testing instruments in said upper portion and including means providing a visual indication of the respective test instrument functions; a plurality of conduits stored in said lower portion and extensible therefrom for connection to a remotely positioned device to be tested; means mounting said upper portion on said lower portion for combined swiveling and lateral movement with respect to said lower portion; and means to connect the conduits in said lower portion to the test instruments in said upper portion.

2. A testing apparatus as recited in claim 1 including means defining a plurality of bins in said lower portion, and means to retract said conduits into said lower portion loosely piling each of said conduits into a different one of said bins.

3. A testing apparatus as recited in claim 2 wherein said means to retract comprises a first roller, a second roller, means selectively operable to bring said first and second rollers together to pinch one of said conduits therebetween, and means to drive one of said first and second rollers to retract the conduit pinched between said first and second rollers.

4. A testing apparatus as recited in claim 2 wherein said means to retract said conduits comprises a platen, a plurality of rollers one for each of said conduits, means for each of said rollers to bring such roller together with said platen to pinch the corresponding conduit between such roller and said platen, and means to drive said platen to retract the conduit pinched between said platen and such roller.

5. A testing apparatus as recited in claim 1 wherein said means mounting said upper portion on said lower portion comprises a turntable rotatably mounted on said lower portion and means to mount said upper portion on said turntable slidable with respect to said turntable.

6. A testing apparatus as recited in claim 1 including means supporting said cabinet means for movement through a predetermined path.

7. A testing apparatus comprising: a mobile carriage, said carriage being divided into upper and lower portions, means mounting said upper portion on said lower portion, said mounting means comprising a turntable rotatably mounted on said lower portion and means to mount said upper portion on said turntable slidable with respect to said turntable, said turntable having an arcuate slot defined therein disposed concentrically about the axis of rotation of said turntable, and a plurality of testing instruments providing visual indications mounted on said upper portion, said test instruments having conduits extendable from said lower portion passing from said testing instruments into said lower carriage portion through said arcuate slot in said turntable.

References Cited by the Examiner

UNITED STATES PATENTS

| 1,214,433 | 1/1917 | Crane et al. | 317—99 X |
| 2,610,099 | 9/1952 | McNamara | 312—322 X |
| 2,612,777 | 10/1952 | Greer | 73—1 |
| 3,032,287 | 10/1959 | Katz | 242—55.17 |

FOREIGN PATENTS 86,187  4/1936  Sweden.

OTHER REFERENCES

Allen Electric and Equipment Co. advertising brochure: Modern Automotive Testing and Servicing Equipment. Kalamazoo, Mich. 1959, page 7. Copy in 73–116.

RICHARD C. QUEISSER, *Primary Examiner.*

J. W. MYRACLE, *Assistant Examiner.*